US009386758B2

(12) United States Patent
Dionne (10) Patent No.: US 9,386,758 B2
(45) Date of Patent: Jul. 12, 2016

(54) PET GROOMING DEVICE

(71) Applicant: Alicia Dionne, Lake Villa, IL (US)

(72) Inventor: Alicia Dionne, Lake Villa, IL (US)

( * ) Notice: Subject to any disclaimer, the term of this patent is extended or adjusted under 35 U.S.C. 154(b) by 325 days.

(21) Appl. No.: 13/675,606

(22) Filed: Nov. 13, 2012

(65) Prior Publication Data

US 2013/0061813 A1    Mar. 14, 2013

Related U.S. Application Data

(63) Continuation-in-part of application No. 12/628,496, filed on Dec. 1, 2009, now Pat. No. 8,322,307.

(51) Int. Cl.
*A01K 13/00*      (2006.01)

(52) U.S. Cl.
CPC .................. *A01K 13/002* (2013.01)

(58) Field of Classification Search
CPC .... A01K 13/00; A01K 13/002; A01K 13/003
USPC ......... 119/600, 602, 603, 611, 612, 615, 618, 119/619, 650, 652, 664
See application file for complete search history.

(56) References Cited

U.S. PATENT DOCUMENTS

| | | | |
|---|---|---|---|
| 1,607,674 A * | 11/1926 | De Shazo Ives | 132/114 |
| 2,702,914 A * | 3/1955 | Kittle et al. | 15/114 |
| 3,574,885 A | 4/1971 | Jones | |
| 4,237,822 A * | 12/1980 | Kaiser, Jr. | A01K 13/002 119/603 |
| 4,312,598 A | 1/1982 | Vagner | |
| 4,995,344 A | 2/1991 | Olson | |
| 5,211,131 A | 5/1993 | Plyler | |
| 5,261,426 A | 11/1993 | Kellett et al. | |
| 5,445,825 A * | 8/1995 | Copelan et al. | 424/448 |
| 5,862,563 A | 1/1999 | Hartmann | |
| 5,930,860 A * | 8/1999 | Shipp | 15/110 |
| 6,158,442 A | 12/2000 | Piatetsky | |
| 6,161,245 A * | 12/2000 | Weihrauch | 15/201 |
| D444,925 S | 7/2001 | Monette | |
| 6,793,434 B1 | 9/2004 | Olson | |
| 7,225,815 B2 | 6/2007 | Kung | |
| 7,908,700 B2 | 3/2011 | DiPippo | |
| 2004/0168269 A1 * | 9/2004 | Kunita et al. | 15/22.2 |
| 2005/0138745 A1 * | 6/2005 | Huang | 15/187 |
| 2006/0200925 A1 * | 9/2006 | Moskovich et al. | 15/167.1 |
| 2007/0261643 A1 | 11/2007 | Hurwitz | |
| 2008/0052850 A1 | 3/2008 | McKay | |
| 2008/0120798 A1 * | 5/2008 | Sorrentino et al. | 15/106 |

\* cited by examiner

*Primary Examiner* — Monica Williams
*Assistant Examiner* — Thien Thanh Pham
(74) *Attorney, Agent, or Firm* — Greer, Burns & Crain, Ltd.

(57) ABSTRACT

A grooming device is provided, including a brush base including a plurality of bristles disposed about a periphery of the base and at least one base latch for securing a biased platform such that the platform reciprocates relative to the base. The biased platform has at least one platform latch for securing the biased platform to the brush base by interconnecting the brush base latch with the biased platform latch, the at least one platform latch accommodating the reciprocating action. The platform is configured for accommodating at least one wipe for applying a solution to a target substrate.

15 Claims, 8 Drawing Sheets

PET GROOMING DEVICE

RELATED APPLICATION

The present application is a CIP of, and claims 35 USC 120 priority from, U.S. Ser. No. 12/628,496 filed Dec. 1, 2009.

BACKGROUND OF THE INVENTION

The present invention relates generally to grooming devices for pets, and provides such a device designed to freshen up a pet in between baths or grooming operations. The present device also facilitates the removal of debris, bacteria, allergens, and offensive odor from a pet, in addition to having the ability to add fragrance, moisture, and shine to its coat.

A conventional pet grooming device resembles a conventional hair brush with bristles of uniform length that are located on both upper and lower sides the brush. The product includes a moistened cloth or pad that covers all of the individual bristles. One disadvantage of this device is that the cloth does not make adequate contact with the pet's hair or fur, since the bristles are completely covered by the cloth. As such, the device is unable to separate hairs to wipe them clean. Another disadvantage of the prior pet groomer is that the cloths are difficult to remove when replacement is required, because they tend to bunch together and must be individually removed from each bristle. This process is cumbersome and awkward.

SUMMARY

A pet grooming device is provided that includes a brush base with a perimeter of bristles and a biased platform supporting an attached disposable wipe or pad. Specifically, the present device is designed so that the wipe makes increased contact with the pet's hair or coat for more effective cleansing, bacteria removal, deodorizing, application of fragrance and shining of the fur or coat. Another important feature is that the present grooming device fits comfortably into a user's right or left hand to provide enhanced comfort and control when maneuvering it around the contours of the pet. Additionally, in the present grooming device wipes are easily interchanged based on the desired application. While preferably useful for grooming pets, it is contemplated that the present grooming device is applicable for other grooming or cleaning operations where brushes and/or disposable wipes are conventionally employed.

More specifically, a grooming device is provided, including a brush base including a plurality of bristles disposed about a periphery of the base and at least one base latch for securing a biased platform such that the platform reciprocates relative to the base. The biased platform having at least one platform latch for securing the biased platform to the brush base by interconnecting the brush base latch with the biased platform latch, the at least one platform latch accommodating the reciprocating action. The platform is configured for accommodating at least one wipe for applying a solution to a target substrate.

In another embodiment, a pet grooming device is provided, including a brush base having a first surface, a second surface, a plurality of bristles projecting from the first surface, and at least one base latch for securing a biased platform, said biased platform having an outer surface and an inner surface, and at least one platform latch. At least one spring is integrally formed on the base and engages an underside of the biased platform. The biased platform is attached to the brush base first surface by interconnecting the at least one brush base latch with the at least one biased platform latch. A wipe is positioned on the biased platform, and a ring is attached to the biased platform for maintaining the wipe on the biased platform, the wipe being positioned between the ring and the biased platform.

In still another embodiment, a wipe is provided for use with a pet grooming device including a brush base including a plurality of bristles disposed about a periphery of the base and at least one base latch for securing a biased platform such that the platform reciprocates relative to the base, the biased platform having at least one platform latch for securing the biased platform to the brush base by interconnecting the brush base latch with the biased platform latch, the at least one platform latch accommodating the reciprocating action. The wipe includes a nonwoven cellulose-based fabric having an approximate weight of 150-330 grams per square meter and a thickness of approximately 4.0 mm, and being impregnated with at least one of a disinfectant, a cleaning agent, a coat conditioner, an insect repellant, a deodorizer, a paw cleaner, a sun protectant, a disinfectant and a moisturizer.

DETAILED DESCRIPTION OF THE EMBODIMENT

Figure 1:
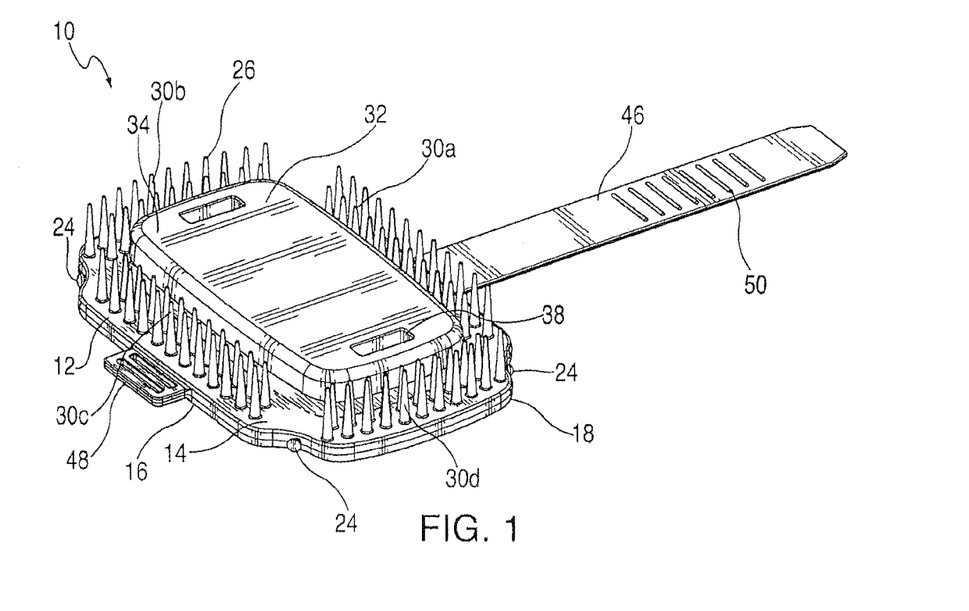
FIG. 1 is a top perspective view of the present pet grooming device.
Figure 2:
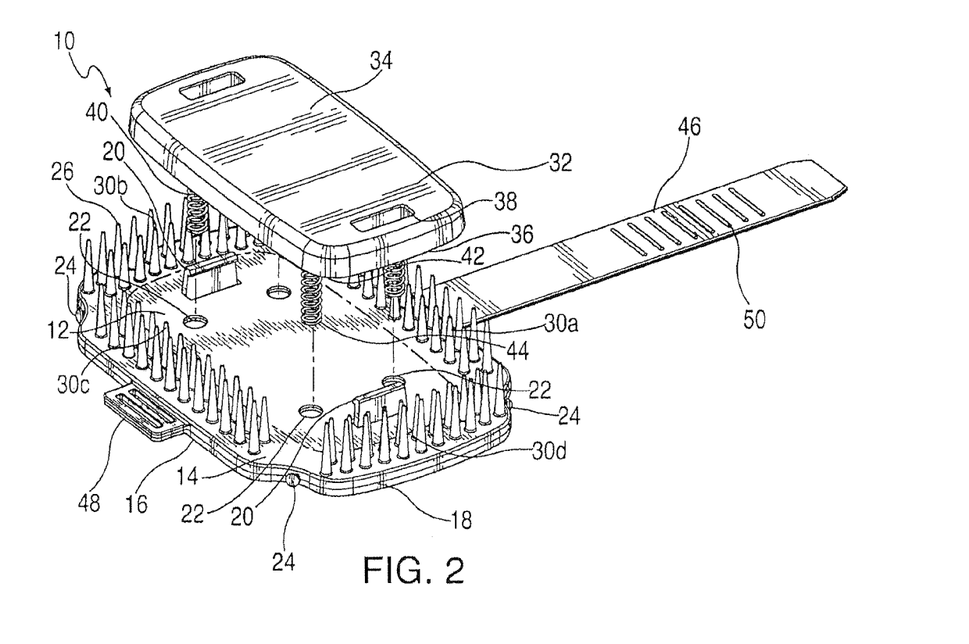
FIG. 2 is an exploded perspective view of the present pet grooming device.

Referring now to FIGS. 1-2, a grooming device is generally designated as 10. While preferably intended for use in grooming pets such as cats and dots, it is also contemplated that the present device 10 is usable for other cleaning or grooming applications where conventional brushes or disposable wipes are employed. The device 10 includes a brush base 12 having a first, inner surface 14 and a second, outer surface 16 opposite the first surface, and a side or peripheral edge 18. In this embodiment, the brush base 12 is generally rectangular, however, other shapes are considered suitable. Pliable rubber, plastic or other similar material are preferred for the brush base 12, and more specifically, pliable rubber or plastic having a shore hardness of at least 80 durometers especially is preferred.

The brush base 12 includes at least one latch 20, and preferably a pair of such latches 20 that extend generally perpendicularly from the first surface 14. The latches 20 are preferably integral to the brush base 12, for example, by injection molding, attachment by chemical adhesive, or the like, and may vary in number and arrangement based on design preference. Also included in the brush base 12 is at least one and preferably a plurality of generally cylindrical, recessed spring pockets 22. In the present configuration, four spring pockets 22 are included in a generally rectangular orientation. It is contemplated that the spring pockets 22 may vary in number, configuration and arrangement to suit the situation.

Figure 6:
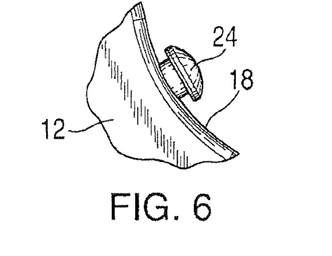
FIG. 6 is a fragmentary top perspective view of a button included on the device.

Referring now to FIGS. 1, 2 and 6, the brush base 12 also includes a plurality of buttons 24. The buttons 24 are preferably located on the side edge 18 and protrude horizontally or radially from the brush base 12. In this configuration, the grooming device 10 includes four buttons 24, each located approximately at an associated corner of the brush base 12. The buttons 24 are generally round, but other button shapes are also contemplated. More specifically, it is preferred that the buttons 24 are a protruding lug shape with a relatively large, dominant head.

Figure 7:
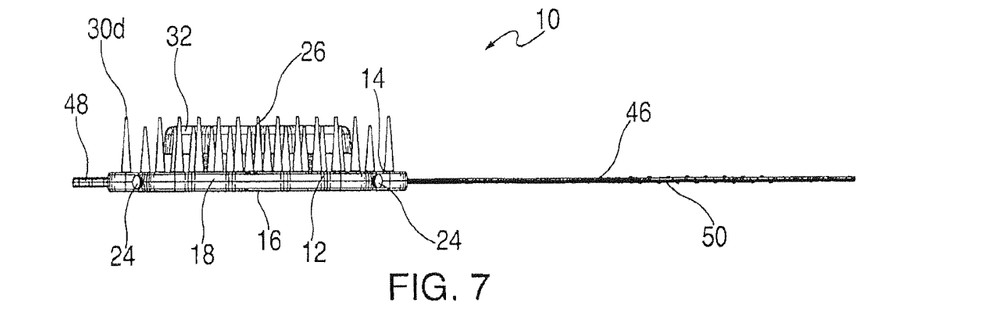
FIG. 7 is a side elevation view of the present pet grooming device.

Also included on the brush base 12 is a plurality of bristles 26 as shown in FIGS. 1, 2 and 7. The preferably pointed bristles 26 project normally from the first surface 14, and are located around the perimeter of the brush base 12. Further, the bristles 26 are grouped together into quadrants 30*a*, 30*b*, 30*c*, 30*d* positioned on each side of the rectangular shaped base 12. It is contemplated that the bristles 26 are provided in various lengths with longer or taller bristles closer to the exterior or peripheral edge 18. Preferably, the bristles 26 on the outside of each quadrant 30*a*, 30*b*, 30*c*, 30*d* (those closer to the peripheral edge 18) are approximately 0.750 inches tall and the bristles on the inside of each quadrant are approximately 0.625 inches tall. Other lengths for the bristles 26 are also suitable depending on the application. By placing the bristles 26 along the perimeter of the brush base 12, the grooming device 10 maintains contact with pet fur or coat regardless of whether the device is moved vertically or horizontally in grooming strokes. Therefore, pets of different sizes, and especially hard to reach areas of the pets, can be cleaned more effectively than with conventional grooming or cleaning products such as disposable cleaning wipes, leave-in shampoos, and the like.

Referring now to FIGS. 1-4, each grooming device 10 also has a biased platform 32 attached to the first surface 14 of the brush base 12. The biased platform 32 is generally rectangular and includes an outer surface 34 and an inner surface 36 facing the brush base 12 first surface 14. Moreover, the biased platform 32 is preferably made of hard rubber or plastic material.

Included in the biased platform 32 is at least one, and preferably a pair of platform latches 38. The platform latches 38 may vary in number and arrangement to suit the situation. As should be appreciated, the number of platform latches 38 should correspond to the number of brush base latches 20. In the preferred embodiment, the platform latch 38 includes a generally rectangular hollow chamber 39, and is configured for matingly receiving and interlocking with the brush base latch 20.

Figure 3:
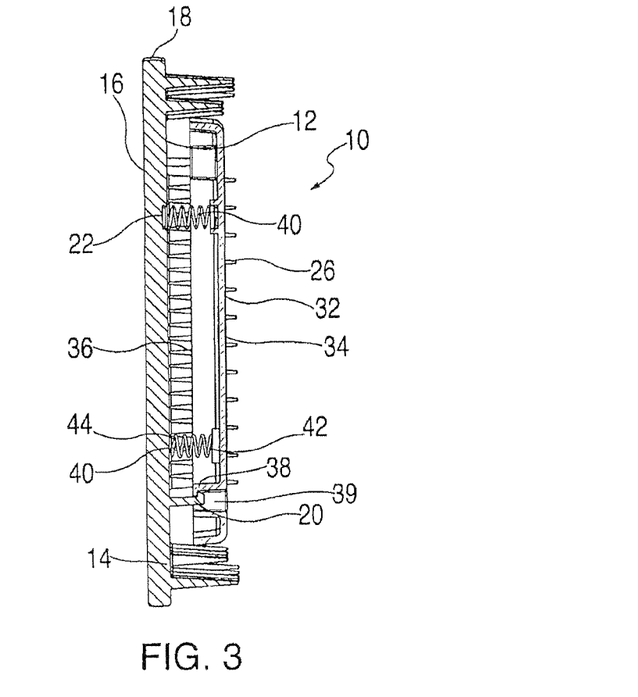
FIG. 3 is a cross-section of the present pet grooming device taken along the line 3-3 of FIG. 5 and in the direction generally indicated.
Figure 4:
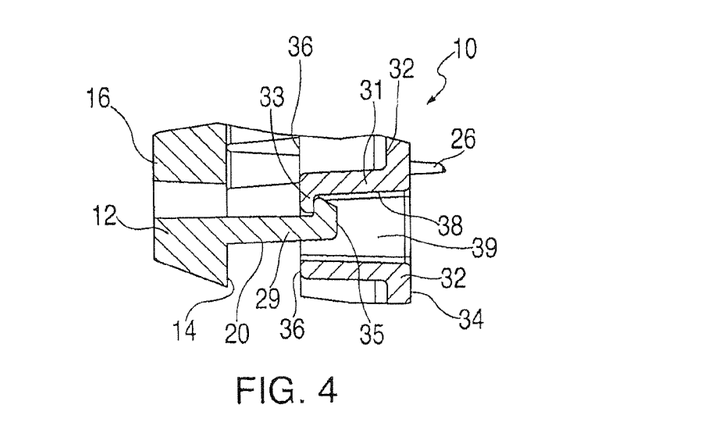
FIG. 4 is an enlarged partial section of the device depicted in FIG. 3.

Referring now to FIGS. 3-4, the position of each brush base latch 20 is respectively aligned with its associated platform latch 38 when the center portion 32 is coupled to the brush base 12. Each latch 20, 38 has a locating aid 29, 31 and a hook 33, 35. As shown in FIG. 4, the corresponding hooks 33, 35 engage each other when the platform 32 engages the base 12.

Figure 9:
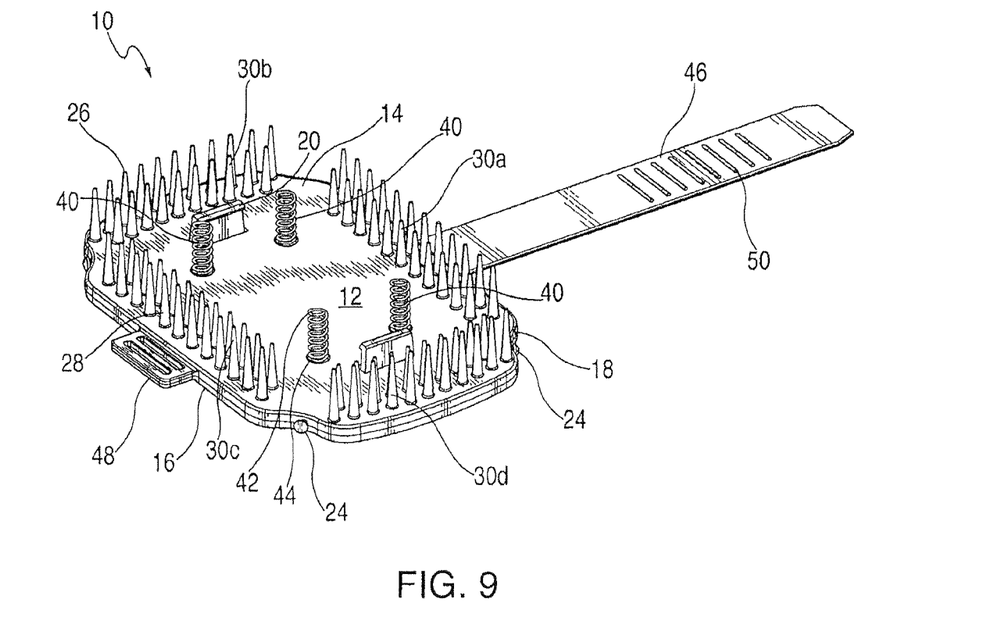
FIG. 9 is a fragmentary top perspective view of the preset grooming device without the biased platform.

Mounted into the biased platform first surface 34 are a plurality of springs 40, as shown in FIGS. 2, 3, and 9. In this embodiment, there are four preferably coiled springs 40, each located approximately in each corner of the biased platform 32 and oriented normally relative to the base 12. The placement and number of springs 40, as well as the type of springs used, may vary based on the level of flexibility desired. Separate metal or plastic springs, and integral plastic springs are also contemplated.

Each spring 40 includes a first end 42 and a second end 44. The first end 42 of each spring 40 is mounted into the first surface 34 of the biased platform 32. The second end 44 of each spring 40 is seated in a corresponding spring pocket 22 located on the first surface 14 of the brush base 12. Each spring pocket 22 is configured to receive the second spring end 44 such that once the second spring end is engaged in the spring pocket, the spring is securely fastened to the brush base 12. In an alternate configuration, each spring pocket 22 may be positioned on the biased platform 32 and each spring 40 may be attached to the brush base 12. The location of each spring 40 on the biased platform 32 corresponds to a spring pocket 22 on the first surface 14 of the brush base 12. As can be seen in FIGS. 2-3, the position of each spring 40 is respectively aligned with its associated spring pocket 22 when the biased platform 32 is latched with the brush base 12.

Turning now to FIGS. 1 and 4, upon assembly, it can be seen that the biased platform latch 38 is interlocked with the brush base latch 20 so that the biased platform 32 clips into place. Once interlocked, the biased platform 32 is secured to the brush base 12. Movement of the platform 32 relative to the base 12 is accommodated by the biasing action of the springs 40 and the length of the latches 38 and 20. The platform latch 38 and chamber 39 are dimensioned to accommodate relative movement of the base 12 via the latch 20 when the platform 32 is pressed against the base 12, temporarily overcoming the biasing force of the springs 40. As such, the platform latch 38 and base latch 20 configuration permits adjustment of the biased platform 32 position relative to the base 12 as it is maneuvered over the contours of the pet's coat. It is further contemplated that once the biased platform 32 is secured to the brush base 12, the biased platform can be removed for cleaning. Removal of the biased platform 32 may require the use of an additional tool, such as a screwdriver, for disconnecting the brush base latch 20 and the biased platform latch 38.

Also featured with the present grooming device 10 is an adjustable strap assembly 46 for attaching the device to a user's hand. Included with the strap assembly 46 is a receiving portion or buckle 48 and a strap portion 50. Both the strap portion 50 and the receiving portion 48 are preferably molded or otherwise fixed into the brush base 12 and are configured so that the strap portion connects with the receiving portion, as is known in the strap art. Once connected, the grooming device 10 is securable to a hand. The strap assembly 46 is made of flexible rubber or other suitable materials.

Figure 5:
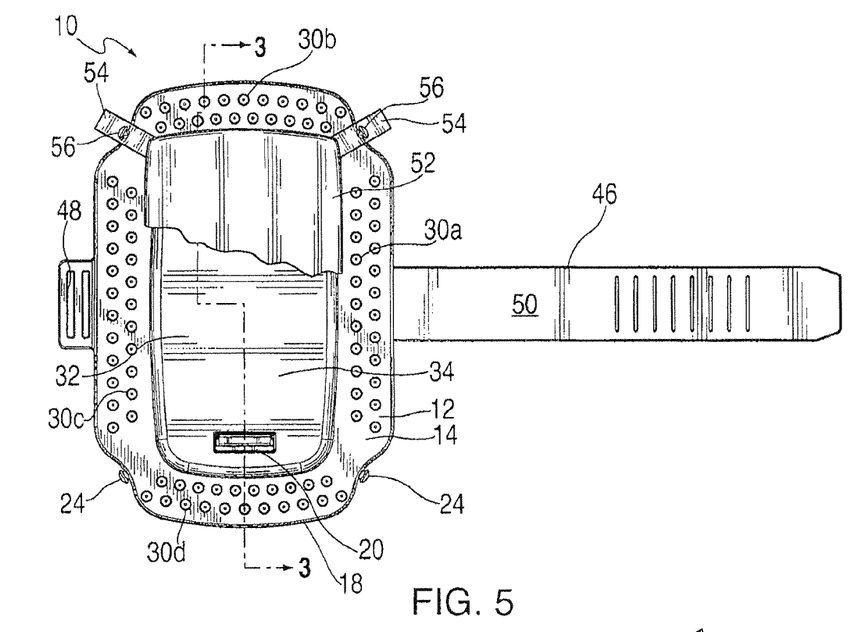
FIG. 5 is an overhead plan view of the present pet grooming device with a wipe attached.
Figure 8A:
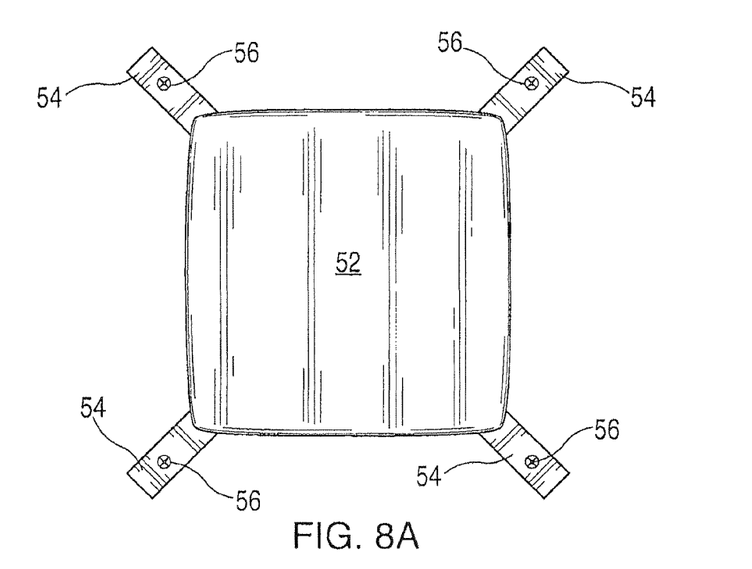
FIG. 8A is a top view of the wipe of the present pet grooming device.
Figure 8B:
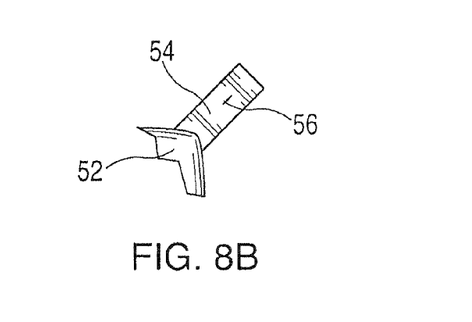
FIG. 8B is a top view of the tab associated with the wipe in FIG. 8A.

Turning now to FIGS. 5 and 8, the present grooming device also includes a disposable wiping cloth, wipe or pad 52. In this embodiment, the wipe 52 is generally rectangular. However, since the wipe 52 is configured to fit the shape of the biased platform 32, other configurations are contemplated, depending on the shape of the biased platform. Each wipe 52 includes an optional integrated plurality of tabs 54 for securing the wipe to the grooming device 10. In the preferred embodiment, the wipe 52 is configured with four tabs 54 extending outwardly from the wipe and over each corner of the biased platform 32. Each tab 54 has an opening 56 for securing the tab 54 to the button 24 located on the side surface 18 of the brush base 12. Preferably, the opening 56 is either an "X" cutout or small hole. Other configurations for the opening 56, such as a slit, are also suitable.

The technique for attaching the tab 54 to the button 24 will vary depending on the configuration of the opening 56. In most cases, the wipe 52 is fastened to the button 24 by being extended over the button 24 where the opening will fit over the button. Once attached, the wipe 52 is securely fastened so that it will withstand pressure from the movement of the pet grooming device 10.

The wipe 52 is made of a durable fabric that can hold or be saturated with a large amount of embedded liquid. A preferred material or fabric for the pad 52 is nonwoven viscose fiber needle felt, having a weight of approximately 150-330 grams per square meter determined by ASTM D461 (a variation of ±10% is contemplated), and a thickness of approximately 4.0 mm determined by ASTM D5729. This preferred material has an absorptive capacity of 13-13.5 times its weight. The pads 52 are preferably flushable and biodegradable and are recycled with paper, since they are 85% cellulose. The size of the pad is approximately 3⅞" wide by 4¾" long. It is contemplated that the present wipes 52 may be impregnated with any of the following exemplary compositions:

Cleaning Wipes

Water, aloe Vera, vitamine, glycerin, citric acid, polysorbate 20, kathon, potassium sorbate, fragrance, cetearyl isonanoate, magnesium sulfate, chamomine extract.

Cleaning Wipes

Water, butylenes glycol, amodimethicone, quaternium 15, lauryl betaine, cetylpyidium chloride, fragrance, camellia sinesis leaf extract, aloe barbadensis leaf extract, macrocystis pyrifera (kelp), citric acid, sodium citrate, kathon, potassium sorbate.

Coat Conditioner Wipes

Added: yogurt extract, hordeum distichon extract, sodium citrate.

Purified water, polysorbate 20, green tea leaf extract, Hawaiian awapuhi extract, aloe Vera, vitamine, benzoic acid (preservative).

Dog Wipes

Purified water, decyl glucoside, glycernin, sodium bicarbonate, polyquternium 10, hydrolyzed silk (silk protein), vitamine, saccharomoes ferment, phenethyl alcohol, capryl glycol & trideceth, phenoxyethanol, potassium sorbate, PEG/PPG, 18/18 dimethicom, citrus grandis (grapefruit) peel oil.

Deodorizing Wipes

Water, butylenes glycol, amodimethicae, quaternium-15, isopropyl alcohol, lauryl betaine, cetylpyridinium chloride, fragrance, hypericium perforafum flower/leaf/stem extract, macrocystis, pyrifera (kelp), citric acid, sodium citrate.

Puppy Wipes

Add: *camellia sinensis* leaf extract, aloe barbadensis leaf extract.

Germ Fighting Paw Wipes

Water, glycerin, aloe barbadensis leaf juice, lanolin, chamomilla, recutita (matricaria) flower extract, lavandula angustifolia (lavender) extract, decyl glucoside, polysorbate 20, benzalkonium chloride, disodium EDTA, fragrance, DMDM hydantoin.

Vitamin Enriched-Waterless Shampoo & Conditioner

Water, chamomilla recutita (matriccaric) flower extract, *helianthus annuus* (sunflower) seed extract, posemarium officinalis leaf extract, aloe barbadensis leaf, avenasative (oat), sodium laureth sulfate, cocamidolpropyl betaine, glycerin butylenes glycol, butyrospermum parkii (shea) butter, prunnus amygdalus dulcis (sweet almond) oil, tocopheryl acetate, copper cluconate, polysorbate 20, thiocitric acid, Peg-12, dimethiane panthenol, zinc gluconate, fragrance, bisodium EDTA, methylchlorooisothiazolinone.

Other contemplated ingredients for the solution impregnating the wipes 52 include Shea butter, vitamin E, essential oils, botanicals, colloidal oatmeal and antioxidants.

Preferably, the wipe 52 is made with all natural ingredients to limit allergic reactions of the pet. The present pet grooming device 10 preferably include at least three different types of disposable wipes 52. One wipe 52 is used to clean the pet and has an impregnated disinfectant to remove bacteria such as *Escherichia coli* (*E. coli*). This wipe 52 will also remove allergens as well as odor causing particles.

A second wipe 52 is available to deodorize pets. This wipe 52 includes an impregnated deodorizer and/or a fragrance such as "clean pet" smell. Finally, a third wipe 52 has an impregnated coat conditioner to put shine into the pet's hair. This wipe 52 will provide moisture and shine so that it leaves the pet's hair or fur looking healthy and flake free. Other types of wipes 52 are also suitable based on desired application and are impregnated with various compositions for promoting conditioning including improving the shine of a pet's coat, moisturizing, gentle/mild cleansers, cleaning and/or whitening agents, tearless, hypoallergenic and neutral pH, and also optionally has flea repellent, UV protectant as a sunscreen, mosquito repellant, Certain wipes 52 are contemplated as being design as cats only or dogs only. Other wipes 52 are contemplated as being designed for paw cleansing.

An important feature of the present pet grooming device 10 is the flexibility of the biased platform 32 as it moves over the contours of the pet hair or coat. This flexibility enables the biased platform 32 to automatically adjust for all lengths and textures of hair. As pressure is applied while the device 10 skims across the hair, the plurality of springs 40 and dimensioned chamber 39 enable the biased platform 32 to adjust vertically relative to the base 12 so the grooming device 10 is able to brush through long or short hair. While stroking across the natural growth of the hair, the bristles 26, which are preferably relatively resilient and soft, gently lift and separate the hairs while the wipe 52 cleans them.

Further, the pet grooming device 10 can be packaged as an assembly which may include a carrying case (not illustrated) such that the grooming device 10 and the wipes 52 can be stored together. The assembly may also include a refill package of wipes 52.

Referring now to FIGS. 10-14, an additional embodiment of the pet grooming device 10 is generally designated as 100. Components of the embodiment 100 shared with the device 10 are designated using the same reference number. A main distinguishing feature of the device 100 is that the brush base 12 includes at least one latch 102 that extends generally perpendicularly from the first surface 14. In this configuration, four latches 102 are included. The latches 102 are preferably integral to the brush base 12, for example, by injection molding, attachment by chemical adhesive, or the like, and may vary in number and arrangement based on design preference. In this embodiment, the base latch 102 is tubular and defines a chamber 103 with an inwardly projecting peripheral hook 104, and is configured for matingly receiving and interlocking with a tubular platform latch 105.

Figure 12:
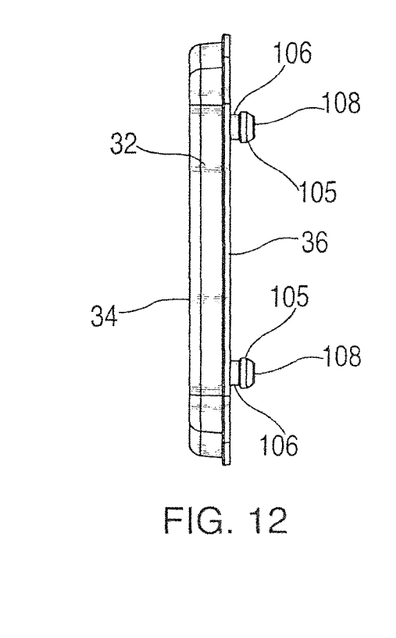
FIG. 12 is a side elevation view of the biased platform of the embodiment of FIG. 10.
Figure 13:
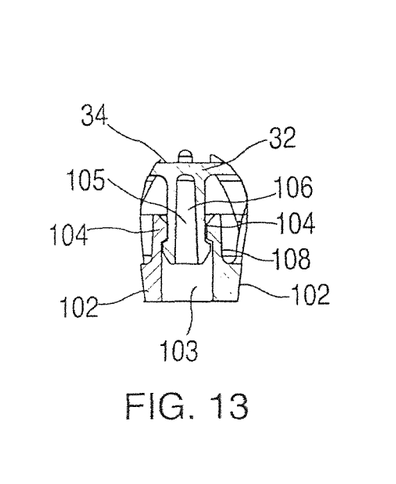
FIG. 13 is a vertical fragmentary cross-section of the latching mechanism of the embodiment of FIG. 10.

As best shown in FIGS. 12-13, the biased platform 32 includes at least one, and preferably four platform latches 105 positioned on the inner surface 36. The platform latches 105 may vary in number and arrangement to suit the situation. As should be appreciated, the number of platform latches 105 preferably corresponds to the number of brush base latches 102. In the device 100, the platform latch 105 is oriented normally relative to the base 12 and includes a tubular stem portion 106 with a smaller diameter than the latch 102 and a peripherally outwardly projecting lip 108 that is configured for matingly interlocking with the brush base latch 102. Preferably, each latch 108 is located approximately in each corner of the base 12.

Figures 10, 11:
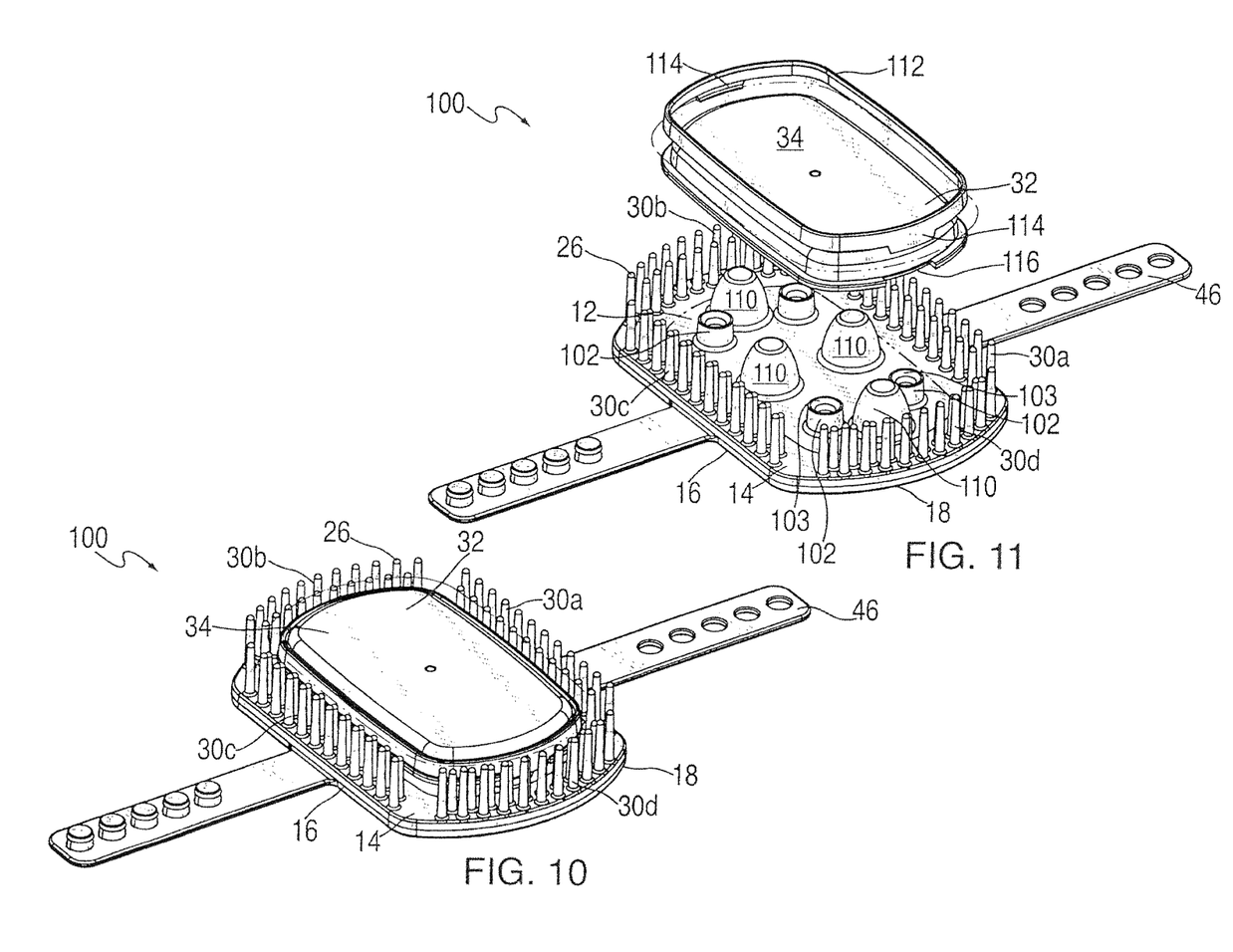
FIG. 10 is a top perspective view of an additional embodiment of the present pet grooming device.
FIG. 11 is an exploded perspective view of the embodiment of FIG. 10.

Mounted into the biased platform first surface 34 are a plurality of springs 110, as shown in FIG. 11. In the device 100, there are four preferably plastic molded springs 110 integral to the base 12, each located approximately in each quadrant of the base and oriented normally relative to the base. The springs 110 are hollow and conical in shape and have relatively thin walls providing biasing force. The placement, configuration and number of springs 110 in the device may vary based on the level of flexibility desired.

Figure 14:
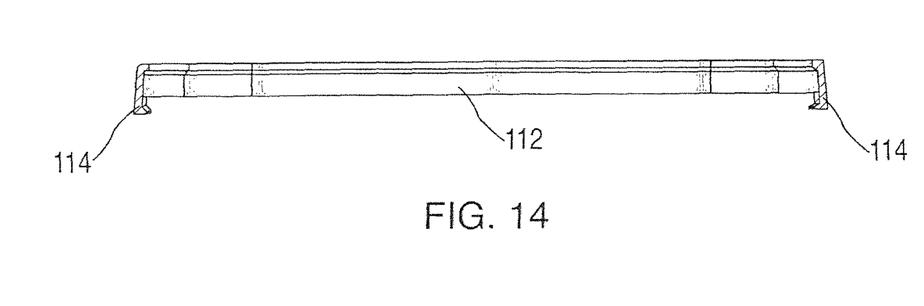
FIG. 14 is vertical cross-section of a retaining ring in the embodiment of FIG. 10.

Referring now to FIGS. 11 and 14, the device 100 also includes a ring 112 for securing the wipe 52 to the biased platform 32. The ring 112 is sized to be positioned around a perimeter of the platform 32 and includes at least one latch 114. Additionally, the platform 32 includes at least one indented section 116 for receiving the latch 114. Preferably, the ring 112 includes a pair of latches 114 and the biased platform 32 includes a corresponding pair of indented sections 116. After the wipe 52 is placed onto the platform 32, the ring 112 is placed over the platform and the latches 114 are attached to the corresponding indented sections 116. Once attached, the wipe 52 is securely fastened so that it will withstand pressure from the movement of the pet grooming device 10. In this embodiment, the wipe 52 should be configured to fit the shape of the biased platform 32 so that at least a portion of the wipe is positioned in between the ring 112 and platform when the ring 112 is locked to the platform.

Upon assembly, it can be seen that the biased platform latch 105 is interlocked with the brush base latch 102 so that the biased platform 32 clips into place. Once interlocked, the biased platform 32 is secured to the brush base 12 by the hook 104 which functions to maintain the head 108 inside the base latch 102. Movement of the platform 32 relative to the base 12 is accommodated by the biasing action of the springs 110 and the length of the latches 102 and 105. As best shown in FIG. 13, the base latch chamber 103 is dimensioned to accommodate relative movement of the platform 32 via the latch 105 when the platform is pressed against the base 12, temporarily overcoming the biasing force of the springs 110. As such, the platform latch 105 and base latch 102 configuration permits adjustment of the biased platform 32 position relative to the base 12 as it is maneuvered over the contours of the pet's coat.

Figure 15:
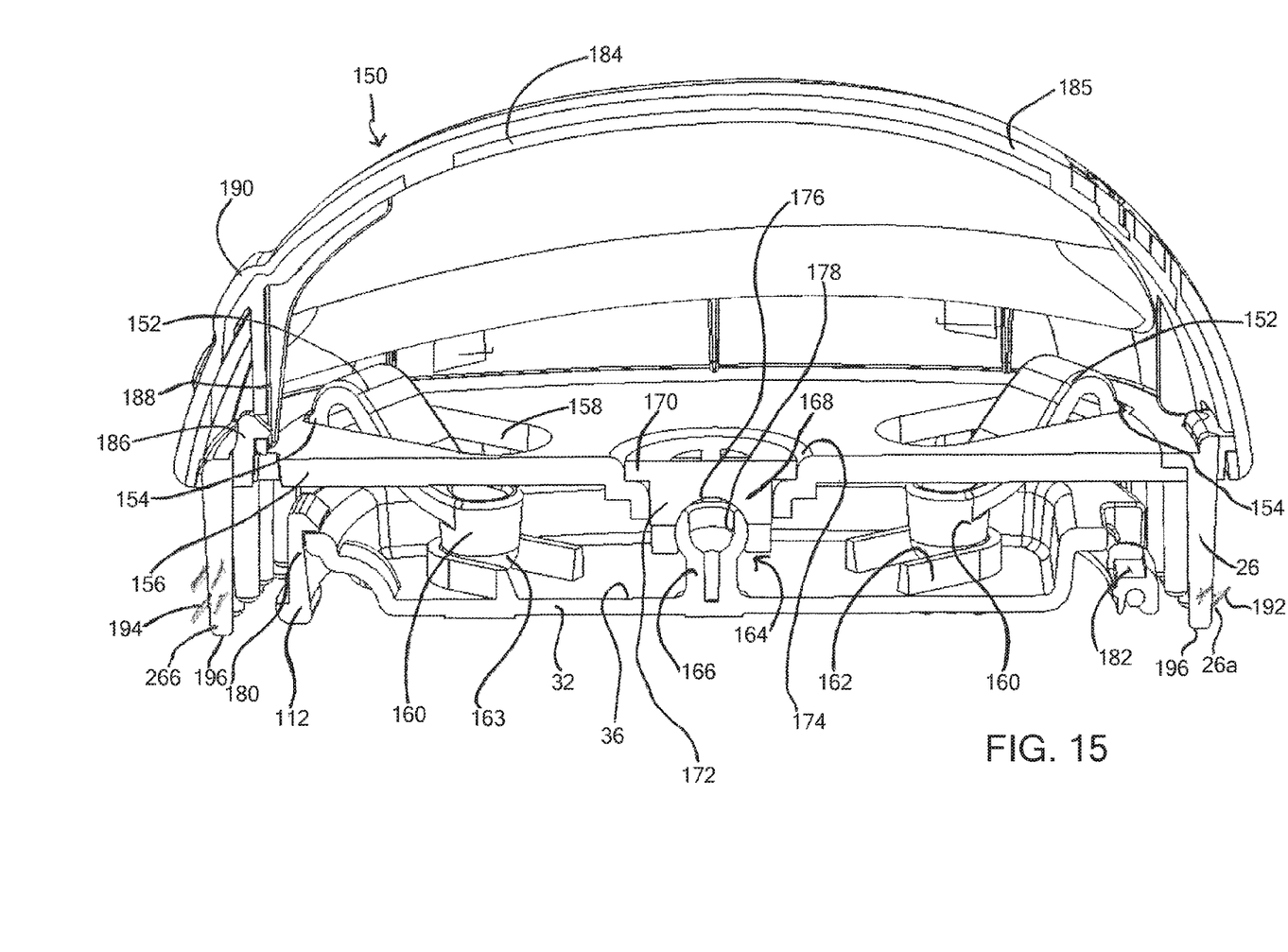
FIG. 15 is a vertical cross-section of an alternate embodiment of the present pet grooming device.

Referring now to FIG. 15, another alternate embodiment of the present pet grooming device is generally designated 150. Components shared with the devices 10 and 100 are designated with identical reference numbers. A main difference between the device 150 and the device 100 of FIGS. 10-14 is that in the device 150, biasing force for the movable and biased platform 32 is provided by a plurality of integrally molded spring arms 152 which extend, cantilever-style, from attachment ends 154 secured to the base 156, similar to the base 12. Each of the spring arms 152 extend through a corresponding spring slot 158 in the base.

Opposite the attachment end 154, each spring arm 152 is provided with an integral spring lug 160 that engages a corresponding socket or receptacle 162 on the underside 36 of the platform 32. Tips 163 of the spring lugs 160 engage the receptacle 162 in a snap fit. The biasing or spring force provided by the spring arms 152 is due in part to their general "S" shape.

Another feature of the base 156 is that a single latch 164 is provided, in the form of a single lug 166 that depends from the underside of the platform 32. A latch fastener 168 is anchored to the base 156 by a flange 170 and a portion 172 passing through a central opening 174 in the base. A socket 176 in the fastener 168 receives a ball portion 178 of the latch lug 166 in a snap-fit engagement. The flange 170 and the portion 172 reciprocate in the opening 174 to accommodate the vertical reciprocation of the platform 32 relative to the base 156.

As is the case with the pet grooming device 100, the wipe 52 is clamped to the platform 32 by the retaining ring 112. The retaining ring 112 is provided with at least one hook 180, and also snap fits into at least one hinge 182.

A further feature of the grooming device 150 is that the strap assembly 46 is replaced with a dome-like grip cover 184 that clips onto the base 156 using a complementary hook 186 on the base and an eyelet 188 on the cover 184. It is contemplated that the arrangement of the hook and eyelet may be reversed on the respective portions of the base and cover. It is also contemplated that the cover 184 is a relatively rigid material with an overmolded resilient gripping surface 185, or other configuration that promotes positive gripping well known in the art of plastic molded tool handles. A release button 190 on the cover 184 is connected to the eyelet 188, and upon depression of the button by the user, the eyelet is disengaged from the hook 186, thus releasing the cover from the base 156.

Still another feature of the grooming device 150, which is also applicable to the devices 10 and 100, is that the bristles 26a, 26b are optionally provided with laterally projecting barbs 192, 194 which are constructed and arranged for removing loose air from the pet being groomed without pulling the hair from the animal. While the configuration and placement of the barbs 192, 194 may vary to suit the application, on the bristles 26a, the barbs 192 are inclined away from tips 196 of the bristles, while the barbs 194 are inclined towards the tips 196 of the bristles.

While a particular embodiment of the present pet grooming device has been shown and described, it will be appreciated by those skilled in the art that changes and modifications may be made thereto without departing from the invention in its broader aspects and as set forth above.

What is claimed:
1. A pet grooming device, comprising:
a brush base including a plurality of bristles disposed about a periphery of said base and at least one base latch for securing a biased platform such that said platform reciprocates relative to and is biased away from said base, while said bristles remain fixed to said base, so that said platform moves relative to said bristles said plurality of bristles is external to a perimeter of said platform;
said biased platform having at least one platform latch for securing said biased platform to said brush base by interconnecting the brush base latch with the biased platform latch, said at least one platform latch accommodating said reciprocating action of said platform relative to said bristles;

said platform accommodating at least one fabric wipe for applying a solution to a target substrate;

a ring releasably engageable with said platform for removably clampingly securing the at least one wipe to said biased platform, wherein the at least one wipe, said ring, and said platform reciprocate together relative to said brush base, such that removal of the ring enables replacement of the at least one wipe; and a dome-shape cover coupled to the brush base at locations along the periphery of said base opposite from said at least one wipe, said dome-shape cover providing a surface for receiving a user's hand.

2. The grooming device of claim 1 wherein said ring is provided with a plurality of hooks for releasably engaging said platform.

3. The grooming device of claim 1 further including at least one spring positioned between said biased platform and said brush base.

4. The grooming device of claim 3 wherein said at least one spring is a spring arm integrally formed with said base and engages an underside of said biased platform.

5. The grooming device of claim 4 wherein said biased platform further includes at least one spring receptacle, and said at least one spring has a tip configured for engaging a corresponding one of said at least one receptacle.

6. The grooming device of claim 4 wherein each said spring arm projects through a spring slot in said base.

7. The grooming device of claim 4 wherein each of said spring arm is generally "S"-shaped.

8. The grooming device of claim 1 wherein said plurality of bristles is located around a perimeter of said brush base.

9. The grooming device of claim 1 wherein said plurality of bristles on an outside of a quadrant of said base are longer than the bristles on an inside of the quadrant.

10. The grooming device of claim 1 wherein said at least one wipe is generally rectangular.

11. The grooming device of claim 1 wherein said at least one wipe is scented.

12. The grooming device of claim 1 wherein said at least one wipe includes at least one of a disinfectant, a coat conditioner, an insect repellant, a deodorizer, a paw cleaner, a cleaning agent, a sun protectant, a disinfectant and a moisturizer.

13. The grooming device of claim 1 wherein at least some of said bristles are provided with barbs.

14. The device of claim 13 wherein said barbs are inclined in a direction at least one of toward a tip of said bristle or away from said tip.

15. A pet grooming device comprising:

a brush base having a first surface, a second surface, a plurality of bristles projecting from the first surface, and at least one base latch for securing a biased platform being movable relative to said bristles and to said base said plurality of bristles is external to a perimeter of said platform;

said biased platform having an outer surface and an inner surface, at least one platform latch securing said platform to said base;

at least one spring integrally formed on said base and engaging an underside of said biased platform;

said biased platform being attached to said brush base first surface by interconnecting said at least one brush base latch with said at least one biased platform latch;

a fabric wipe positioned on said biased platform; and a ring removably attached to said biased platform for maintaining said wipe on said biased platform, said wipe being positioned between said ring and said biased platform, said ring being removable to enable replacement of said wipe from said platform;

a dome-shape cover coupled to the brush base at locations along a periphery of said base opposite from said at least one wipe, said dome-shape cover providing a surface for receiving a user's hand.

* * * * *